June 16, 1925.

M. F. ROSE 1,542,527

CUTTING MACHINE

Filed March 28, 1923   3 Sheets-Sheet 3

Inventor
M. F. Rose
By William J. Jacobi
Attorney

Patented June 16, 1925.

1,542,527

UNITED STATES PATENT OFFICE.

MILLARD F. ROSE, OF HUTCHINSON, KANSAS.

CUTTING MACHINE.

Application filed March 28, 1923. Serial No. 628,301.

*To all whom it may concern:*

Be it known that MILLARD F. ROSE, a citizen of the United States of America, residing at Hutchinson, in the county of Reno and State of Kansas, has invented certain new and useful Improvements in Cutting Machines, of which the following is a specification.

My invention relates to cutting machines and is particularly adapted for cutting all bundle grain for thrashing such as milo, maize, kafir corn and all other grain of like character.

The principal object of the invention is to provide a power operated machine of this character wherein the grain is placed on a conveyer and carried to a saw or cutter and thence conducted away from the saw cutter and discharged into a suitable receptacle.

A further object of the invention is to provide a portable machine of this character wherein the conveyer and saw cutter is operated thru the same driving means and which will do a maximum amount of work in a minimum time thus reducing labor and expense of operation.

A further object of the invention is to provide a machine of this character embodying a conveyer for conveying the material to the saw or cutter at one end thereof for severing the material and thus conducting it from the cutter or saw conveyer and deposited into a suitable receptacle.

The invention also provides a portable machine of this character adapted to be drawn over the ground by horses or other traction means at any desirable point on the field to perform the work.

With the preceding and other objects and advantages in mind the invention consists in the novel combination of elements, construction and arrangement of parts and operation as will be specifically referred to, claimed and illustrated in the accompanying drawings, therein—

Figure 3 is a transverse sectional view taken on line 3—3 of Figure 2;

Figure 4 is a detail transverse sectional view on the line 4—4 of Figure 2;

Figure 5 is a detail transverse sectional view showing the end gate.

Figure 1:
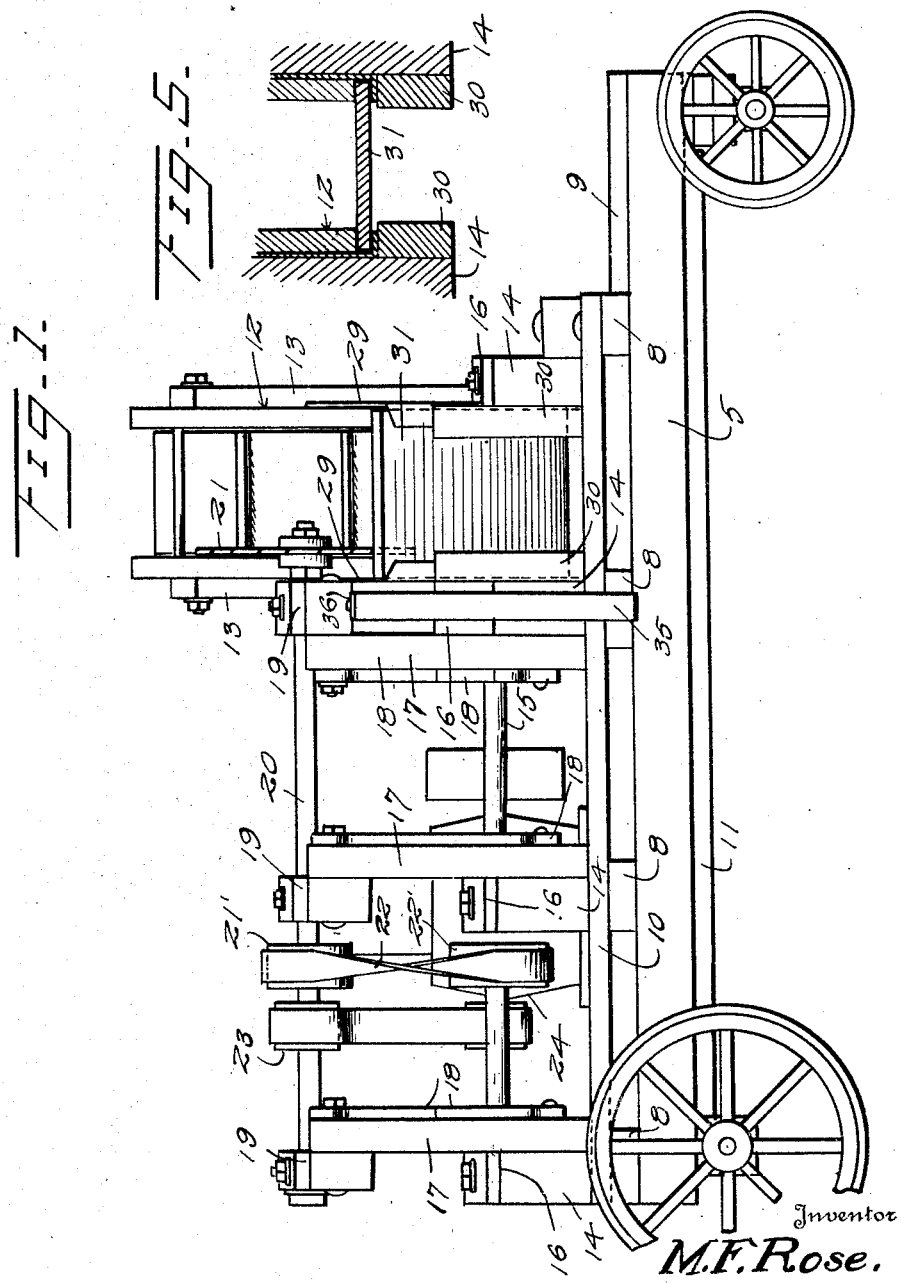
Figure 1 is a side elevation of the cutting machine constructed in accordance with my invention.
Figure 2:
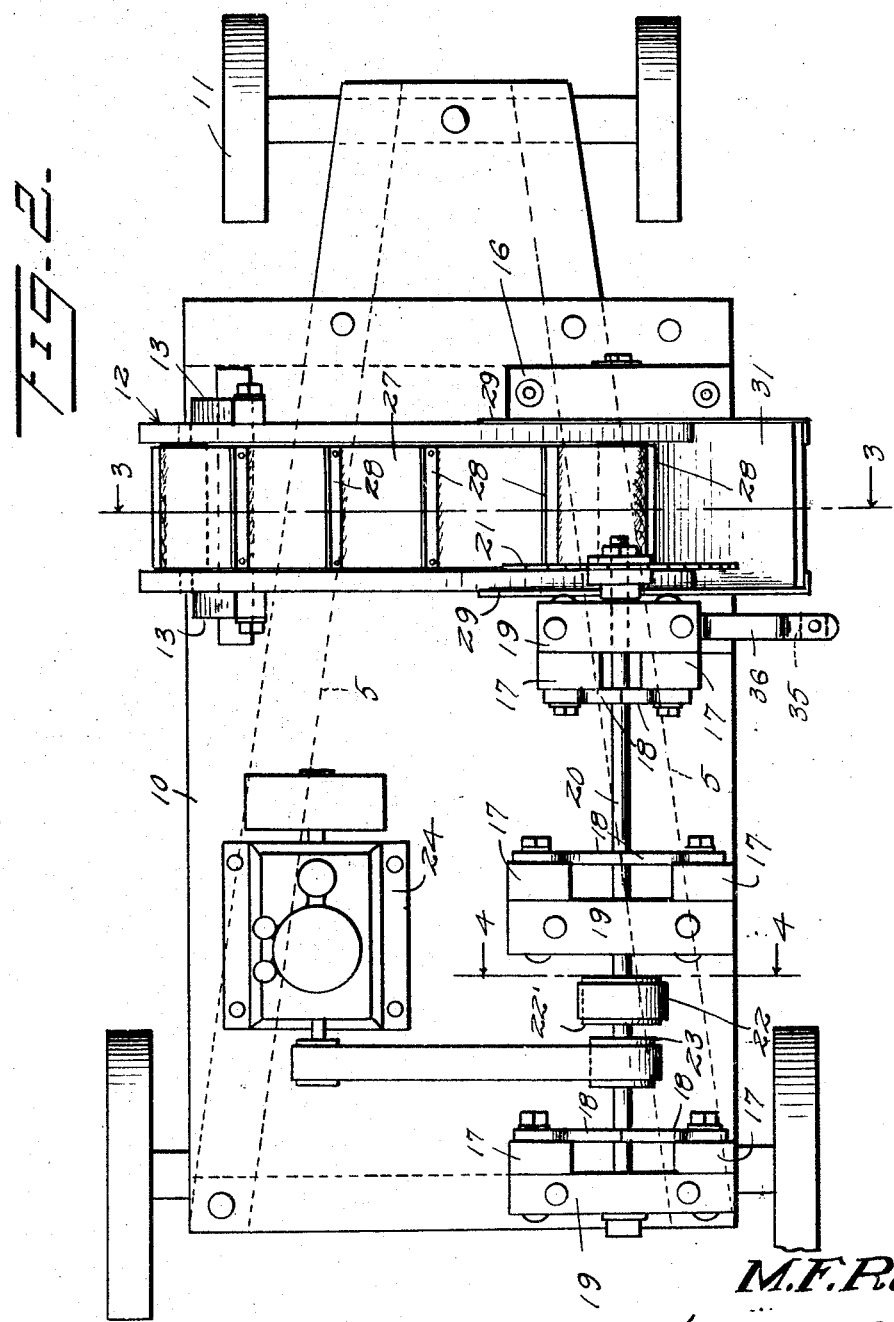
Figure 2 is a plan view of the device.

Referring in detail to the drawing wherein corresponding characters of reference denote corresponding parts thruout the several views the numeral 5 designates a pair of sills arranged in divergent relation and secured thereto and extending transversely across the same are cross beams 8. The platform 9 upon which the operator stands is secured to the sills 5 at one end thereof. Flooring 10 is secured to the cross beams 8 upon which the machine hereinafter described in detail, is mounted. A wagon frame or truck is designated at 11 and upon which the sills 5 are bolted or otherwise secured.

Mounted upon the flooring 10 and extending transversely at one end thereof is an inclined chute or hopper 12 having its rear end supported by legs 13 mounted upon and connected with the flooring 10. The rear end of the hopper or chute 12 is connected with spaced blocks 14 mounted upon the flooring and journaled in these blocks is a transverse shaft 15 extending longitudinally of the flooring and journaled in bearings 16 arranged in spaced relation upon opposite sides of the chute 12. Secured to these bearings 16 are upstanding posts 17 braced by cross bars 18 and carrying at their upper ends bearings 19. A shaft 20 is journaled in the bearings 19 and carries a saw or cutter disc 21 at its inner end disposed over the lower end of the chute or hopper 12 at one side thereof. A pulley 21' is mounted on the shaft 20 and engaged by a crossed belt 22 passing around a pulley 22' on the shaft. The drive pulley 23 is mounted upon the shaft 20 and is connected with any source of power as indicated at 24.

A roller 25 is mounted upon the shaft 15 and disposed at the lower end of the hopper or chute 12 while an idler roller 26 is journaled to the side walls of the hopper or chute at the upper end thereof. An endless belt 27 is engaged around these rollers and riveted or otherwise secured thereto and in spaced relation is a plurality of cleats 28 by which the waste material is conveyed to the upper end of the hopper.

In order to prevent the cut material from being discharged over the side walls of the hopper or chute a sheet metal wall 29 is secured to these walls at their lower end and extend a sufficient height to prevent the material from passing thereover. Blocks 30 are secured to the blocks 14 and have their inner edges beveled and arranged in spaced relation to the lower end of the side walls of the hopper or chute 12 and supports a vertically movable slide or gate valve 31, which may be raised to remove surplus material collecting at the bottom of the hopper. The lower vertical edges of the side walls 29 extend at right angles to embrace the valve or slide 31.

An upstanding post 35 is secured to one end of the transverse beams 6 and secured at the upper end thereof is a metal strap or brace 36 having one end secured to the endmost bearing 16 supporting the shaft 20, to brace the latter bearings.

In the operation of the machine, the operator places a shock or bundle of the material such as maize, kafir corn or the like, across the lower end of the hopper, so that the heads lie in the path of the rotary cutter, against which latter the material is forced so that as the heads or corn tops are severed they fall upon the moving endless belt or conveyor 27, which carries said severed heads or tops upwardly and discharges them into any suitable receptacle or wagon arranged conveniently to the discharge end of the said conveyor. The waste material accumulating between the gate valve 31 and the side walls 29 is discharged into a suitable receptacle arranged at the lower end of the hopper upon the raising of this valve. The valve is left in a closed position until a sufficient quantity of the material has accumulated in the lower end of the hopper.

From the foregoing it will be seen that I have provided a simple, inexpensive and efficient means for carrying out the objects of the invention, and while I have particularly described the means best adapted to perform the functions set forth, various changes in form, proportion and in the minor details of construction may be resorted to without departing from the spirit or sacrificing any of the principles of the invention.

What I claim as new and desire to protect by Letters Patent is:

1. A device of the character described comprising a portable base, an inclined hopper arranged thereon, a gate valve at the lower end thereof and perpendicular to the plane of the floor of the hopper, an endless belt in the hopper, a saw above the hopper at its lower end to sever the material as it is manually fed to the saw, side walls secured to the lower end of the hopper and together with the gate valve constituting a chamber to receive the cut material and hold the same until the valve is raised to permit the discharge of the material from the hopper.

2. A mechanism of the character described comprising a base, an inclined hopper arranged thereon and having its upper end open, a slidable gate at the lower end of said hopper and perpendicular to the plane of the floor thereof, a rotatable saw positioned over the lower end of the hopper having its cutting edge in juxtaposition to the inner face of said gate to thereby provide a feeding throat disposed at one side of the same and adapted to sever the tops from the shock of grain placed across the lower end of the hopper, the severed tops falling into the lower end of the hopper, and an endless belt arranged in the hopper and adapted to carry the severed heads through the hopper and discharge the same from the open end thereof.

3. In an apparatus of the class set forth, an inclined hopper having lateral walls, an endless belt in the hopper, journal rollers over which said endless belt travels, a supplemental wall arranged on each side of and parallel with said hopper walls, a rotary cutter arranged in the vertical plane of said hopper and above said belt, the periphery of said cutter being adapted to travel in close proximity to the upper surface of said belt, adjacent the lower end thereof, a slide gate arranged at the lower end of said hopper and in a plane substantially at right angles to the floor thereof, and means for supporting and guiding said gate in its sliding movements.

4. A machine of the class described, including an inclined conveyor unit comprising side members and an endless belt, a hopper at the lower end of the conveyor unit including sheet metal side walls engaging with the side members of the conveyor unit and the outer end of said walls being flanged inwardly to form one wall of a guideway, a slidable gate arranged in said guideway, and a rotary cutter arranged in the hopper and located between one of the side members of the conveyor unit and the endless belt operating therein.

In testimony whereof I affix my signature.

MILLARD F. ROSE.